April 18, 1961  W. F. TIBBETTS  2,979,945
APPARATUS FOR MEASURING THE DEAD SPACE TRAVEL IN SERVO VALVES
Filed Aug. 16, 1957  6 Sheets-Sheet 2

Inventor:
Willis F. Tibbetts,
by
Attorney

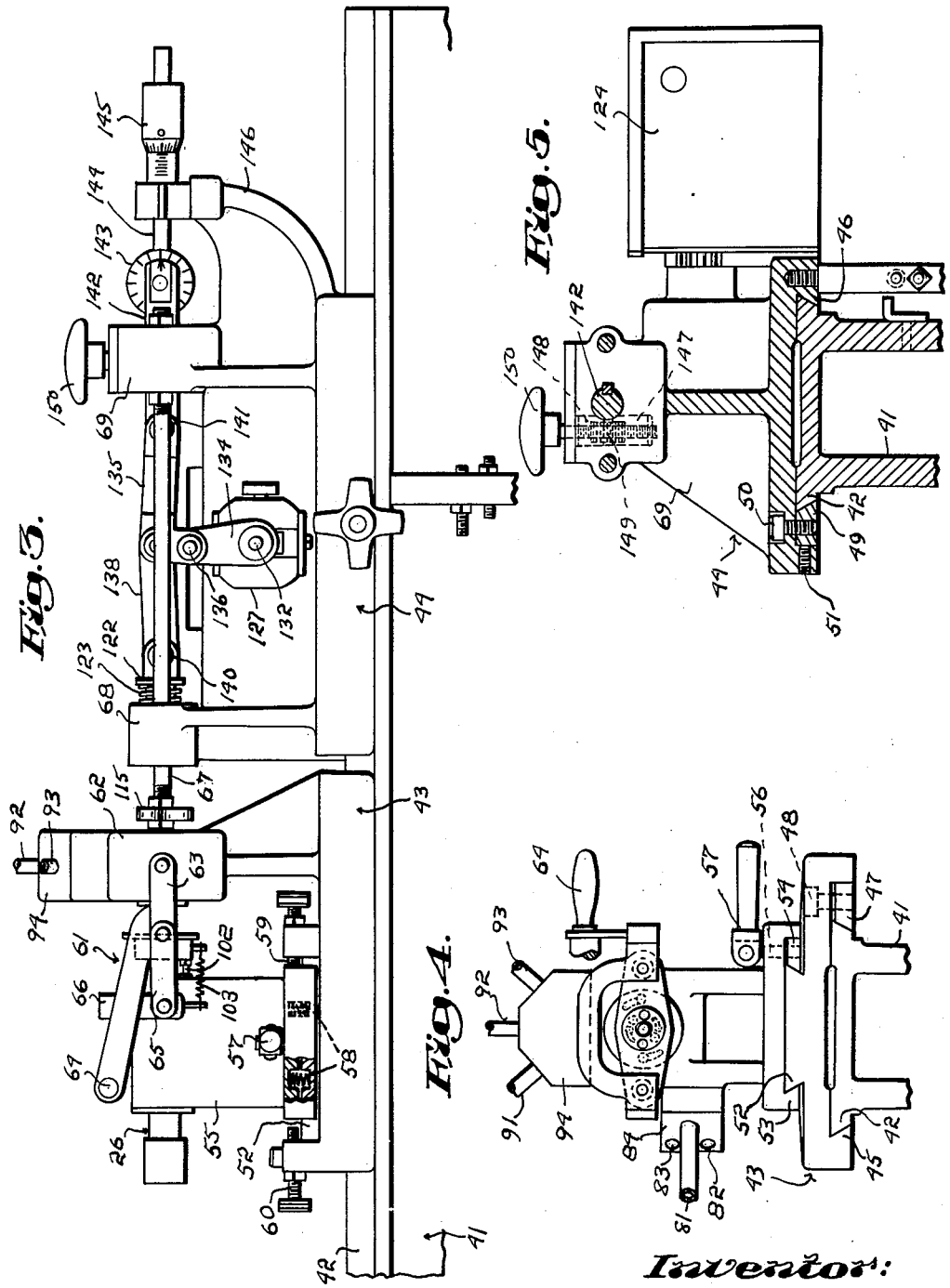

April 18, 1961  W. F. TIBBETTS  2,979,945
APPARATUS FOR MEASURING THE DEAD SPACE TRAVEL IN SERVO VALVES
Filed Aug. 16, 1957  6 Sheets-Sheet 4
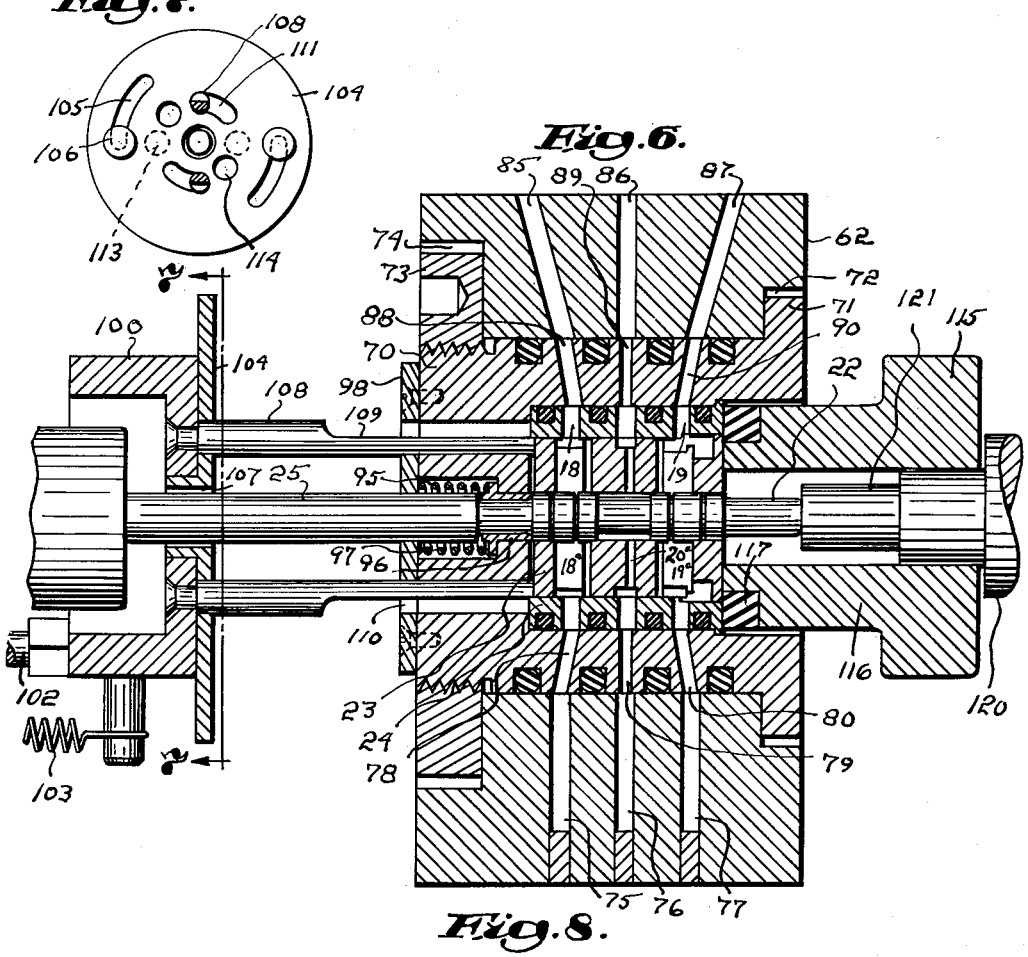
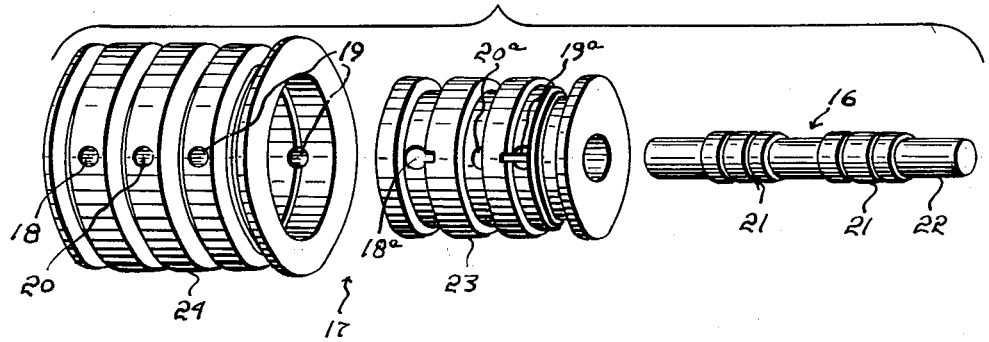
Inventor:
Willis F Tibbetts,
by
Attorney April 18, 1961 W. F. TIBBETTS 2,979,945
APPARATUS FOR MEASURING THE DEAD SPACE TRAVEL IN SERVO VALVES
Filed Aug. 16, 1957 6 Sheets-Sheet 5
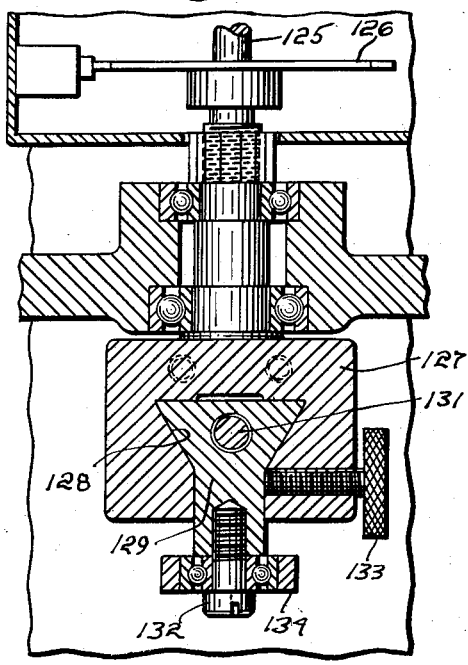
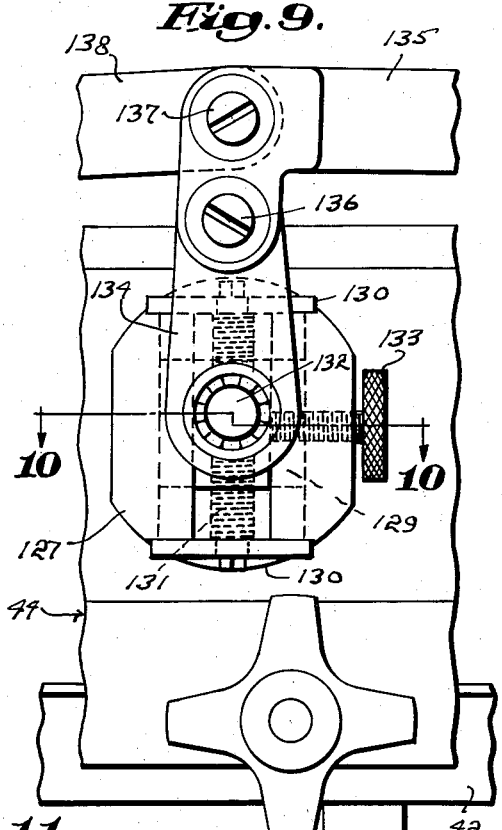
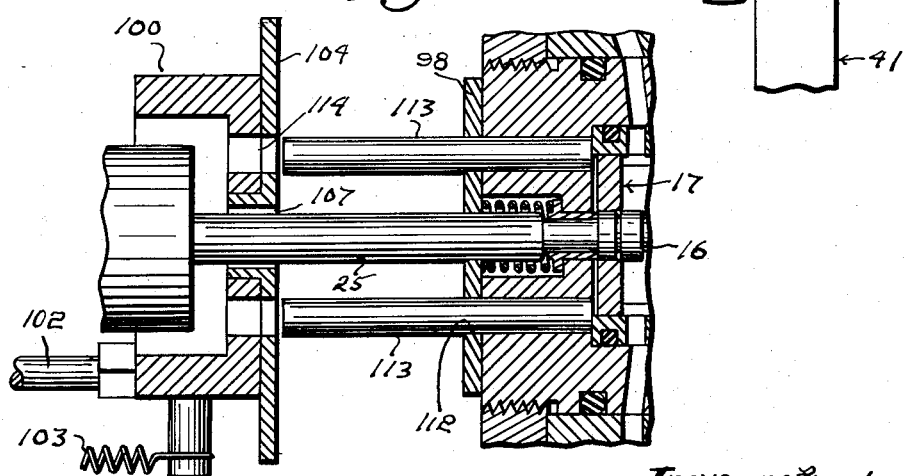
Inventor:
Willis F. Tibbetts,
by
Attorney United States Patent Office 2,979,945
Patented Apr. 18, 1961

2,979,945
APPARATUS FOR MEASURING THE DEAD SPACE TRAVEL IN SERVO VALVES

Willis F. Tibbetts, Reading, Mass., assignor to Flightex Fabrics, Inc., Providence, R.I., a corporation of Rhode Island Filed Aug. 16, 1957, Ser. No. 678,491

16 Claims. (Cl. 73—168)

The present invention relates to apparatus for measuring the dead space in servo valves.

It is often necessary to make accurate measurements of dead space as a basis for corrective grinding operations. "Dead Space," as the term is used herein, means the minimum relative movement between a body or sleeve and a piston or other port closing member that is necessary to connect the inlet ports to outlet ports.

It has been the practice to determine dead space only in linear terms, and it is the general objective of the present invention to make such measurements on a basis where operating conditions are duplicated. The invention provides, accordingly, that the effect of dead space is measured in terms of pressure change points and translated into linear terms.

Apparatus to carry out this objective has a holder for the valve body, clamping mechanism to clamp the body to the holder, and means to effect relative movement between the port closing member and the clamped body. A fluid pressure system is provided that is in communication with the valve ports and establishes a pressure at the inlet port greater than that at the outlet ports. The fluid pressure system includes a back pressure section for each outlet port in which there are pressure response controls responsive to the inlet pressure. Recording means comprise both a chart recorder measuring relative movement between the piston or equivalent part and its valve body and marking means operated by the control in each back pressure section to give markings corresponding to pressure changes related to the indicated path of travel to provide a direct and accurate measurement of dead space.

Other objectives of the invention are concerned with providing, for the apparatus, means for effecting relative movement that have a suitably wide range of accurate adjustments; a holder tightly sealing the valve whose dead space is to be measured and provided with an ejector for the valve body; and, further, a holder adapted, when the valve body has two sleeves, to eject either the inner one or both of them together; an effective hydraulic system; and a control circuit containing safeguards against operation at inopportune times.

These and other of the objectives, novel features and advantages of the invention will be readily apparent from a consideration of the accompanying drawings in which an illustrative embodiment of the invention is shown.

In the drawings:

Fig. 3 is a side view thereof;

Fig. 4 is a view of the fixture as seen from the left hand end thereof;

Fig. 5 is a section taken along the indicated lines 5—5 of Fig. 2;

Fig. 6 is an enlarged longitudinal section of the valve, its holder, and the ejector;

Fig. 7 is a section taken along the indicated lines 7—7 of Fig. 6;

Fig. 8 is an exploded view of a typical valve;

Fig. 9 is an enlarged side view of the crank and associated parts;

Fig. 10 is a section taken along the indicated lines 10—10 of Fig. 9;

Fig. 11 is a fragmentary and partly sectioned view of the ejector mechanism taken at right angles to the showing of the corresponding parts in Fig. 6.

Figure 1:
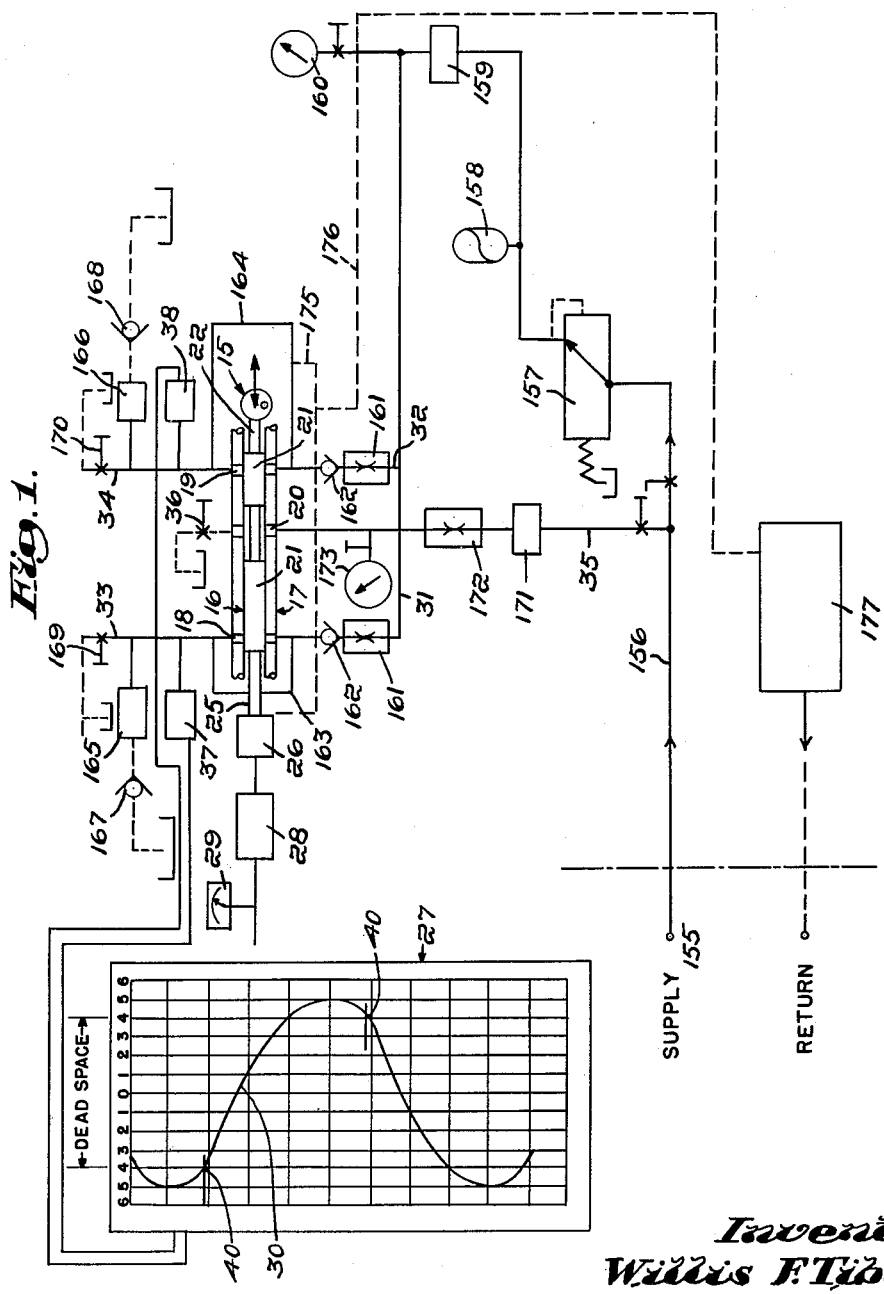
Fig. 1 is a schematic view of the apparatus in accordance with the invention, illustrating generally its components and detailing its hydraulic system.

By way of introduction, reference is first made to Fig. 1 wherein there is generally indicated at 15 a cam as representative of means to reciprocate a piston 16 relative to a generally indicated valve body 17 to connect first one and then the other of its outlet ports 18 and 19 to the inlet port 20. The piston 16 is shown as having a pair of spaced plug portions 21 carried by the stem 22. The valve body 17 is shown in Figs. 6 and 8 as consisting of an inner sleeve 23 and an outer sleeve 24.

One end of the stem 22 is engaged by the reciprocating means 15 and the other end thereof engages the stem 25 of a conventional electronic gauging head 26. Interposed in the circuits between the generally indicated chart recorder 27 and the gauging head 26 is an amplifier 28 and an indicator 29. By these or equivalent means, movement of the piston 16 relative to the valve body 17 is recorded as at 30 on the recorder chart.

Conduits 31 and 32 of the fluid pressure system are in communication with the outlet ports 18 and 19, respectively, and these include back pressure sections 33 and 34, respectively. The conduit 35 of the fluid pressure system is in communication with the inlet port 20 and it has a valve controlled back pressure section 36. As will be later more completely disclosed, the fluid pressure system is operative to maintain a higher pressure at the inlet port 20 than exists at the outlet ports 18 and 19, and in the back pressure sections 33 and 34, there are pressure operated switches 37 and 38, respectively, each adapted to control the operation of the conventional pressure pen associated with the chart recorder 27, and indicated in the drawings at 39 in Fig. 12 only. The switches 37 and 38 are operative in response to the input pressure so that whenever an outlet port is connected to the inlet port, the pressure pen is operated to so indicate on the chart of the recorder 27, as shown at 40 in Fig. 1, thereby to record an accurate expression of the dead space of that valve.

The holding fixture is detailed in Figs. 2-6, and from them it will be seen that it has a generally indicated bed 41 having an undercut way 42 extending from end-to-end thereof along which the generally indicated units 43 and 44 are slidable. The units 43 and 44 have fixed gibs 45 and 46, respectively. The unit 43, as may be seen in Fig. 4, has a locking gib 47 adapted to be clamped against the proximate face of the way 42 as by means of screws 48. The unit 44, as may be seen in Fig. 5, has a gib 49 adjustable, as by means of screws 50, with set screws 51 being provided to ensure the maintenance of its adjustment.

Figure 2:
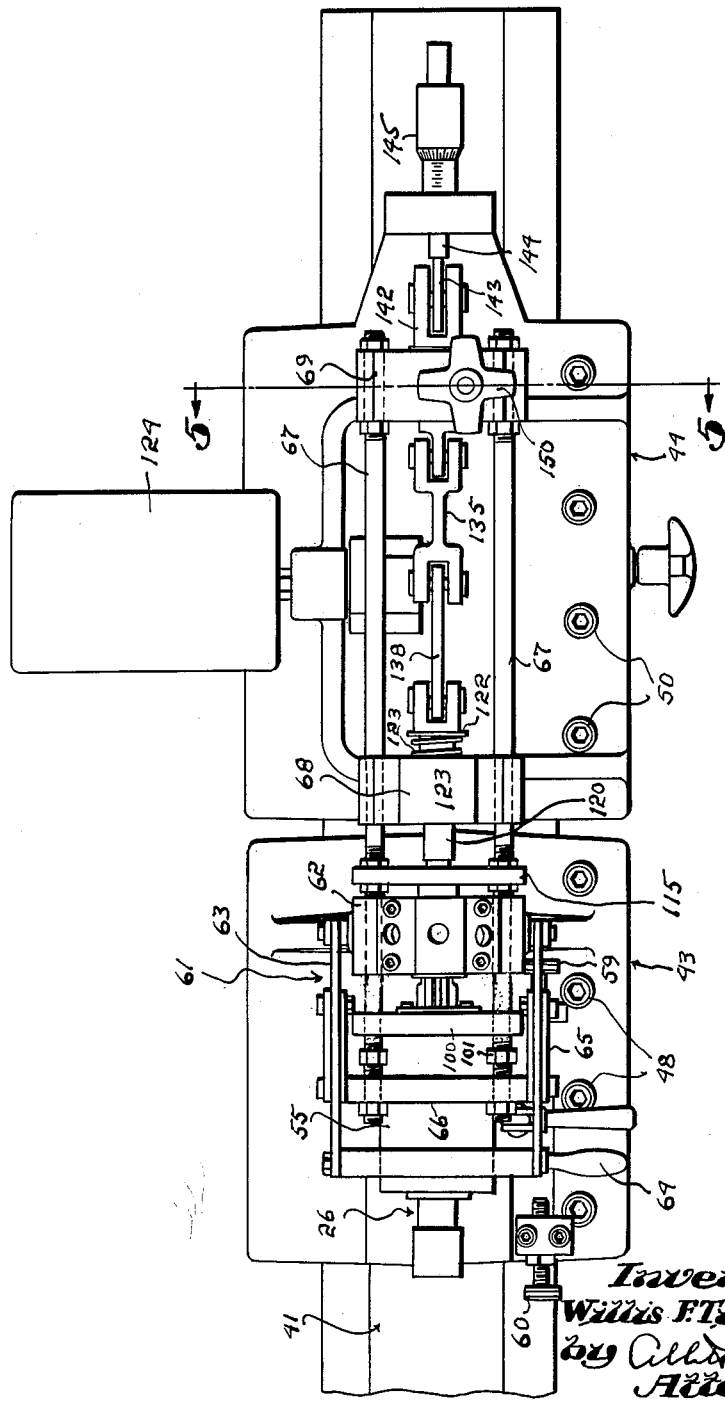
Fig. 2 is a plan view of the holding fixture.

The unit 43, see Figs. 2, 3 and 4, has an undercut way 52 extending in the same direction as the way 42 and receiving the fixed gib 53 and the locking gib 54 of the support 55 for the gauging head 26. It will be noted that the gib 54 is supported by the bolt 56 which is under the control of the manually operated release cam 57 located between the springs 58, which normally are operative to place the gib 54 under way-gripping tension. The support 55 is slidable between adjustable stops 59 and 60, with the support being in engagement with the stop 59 when a finished valve is to be tested, and in engagement with the stop 60 when a valve is to be tested before the ends of its stem 22 have been cut to their finished length.

In practice, the unit 43 is fixed on the bed 41, while the unit 44 is slidable therealong in response to the actuation of a toggle, generally indicated at 61. The unit 43 is also provided with a holder 62 to which are pivoted the pair of arms 63 of the toggle 61. The free ends of the arms 63 are interconnected by the handle 64. Links 65 are pivoted to the arms 63 and to the header 66 on the tie rods 67. The tie rods 67 extend slidably through the holder 62 and through the mounts 68 and 69 of the unit 44 to which they are locked.

The holder 62, as may best be seen in Fig. 6, has a bore extending through it receiving the adapter sleeve 70 for the valve body, which sleeve has a flange 71 at one end entrant of the seat 72, threaded on its other end is the locking nut 73 entrant of the seat 74. The holder 62 has ports 75, 76 and 77 in communication with corresponding radial ports 78, 79 and 80, respectively, in the sleeve 70 and with ports 81, 82 and 83, respectively, in the input block 84 of the holder 62. To the ports 81, 82 and 83 are fitted the delivery conduits 31, 35 and 32. The holder 62 also has ports 85, 86 and 87 in communication with the sleeve ports 88, 89 and 90, respectively, and with ports 91, 92 and 93, respectively, of the block 94 of the holder 62. To the ports 91, 92 and 93 are fitted the back pressure sections 33, 36 and 34, respectively. The sleeve ports 78 and 88, 79 and 89 and 80 and 90 are in communication with the diametrically opposed pairs of ports of the valve body indicated at 18, 20 and 19, respectively, in the case of the outer sleeve 24 and at 18a, 20a, 19a, respectively, in the case of the inner sleeve 23.

The sleeve 70 has an axial countersunk bore 95 for the flanged sleeve 96 dimensioned to slidably receive the end of the stem 22 that engages the stem 25 of the gauging head 26. The flanged sleeve 96 is engaged by a spring 97 backed by the retainer disc 98. As the flanged sleeve 96 engages the proximate plug portion 21 of the piston 16, the spring 97 is operative to move the piston 16 during the return stroke of reciprocating means 15.

A yoke 100, see Figs. 6 and 11, is slidably mounted on tie rods 67 for engagement by the tie rod nuts 101 after the tie rods have been slid to a predetermined extent relative to the holder 62 by means of the toggle 61. The yoke 100 normally is in engagement with its stop 102 under the influence of the return spring 103. A disc 104 has arcuate slots 105 through which extend rivets 106 by which it is anchored to the yoke 100 so that the disc 104 may be turned relative thereto through approximately 45°. The yoke 100 and disc 104 have a centrally passageway 107 for the engaging head stem 25, and they also carry a pair of diametrically spaced pins 108 having ends 109 slidably extending through appropriately located bores 110 in the disc 98, thus to be engageable with the inner sleeve 23 when the toggle 61 is actuated. As the pins 108 extend through arcuate slots 111 in the disc 104, the disc 104 may be partially rotated without affecting their function.

The disc 98 and the adapter sleeve 70 are also provided with a pair of diametrically disposed bores 112, see Fig. 11, and in these are located pins 113 engaging the outer sleeve 24 when the disc 104 is in a first position in which opening movement of the toggle 61 results in both sets of pins being actuated and both sleeves ejected. The disc 104 and the yoke 100 have bores 114 which, in the second position thereof, slidably receive the pins 113 so that they are not actuated and only the inner sleeve 23 is ejected.

A second yoke 115 is carried by the tie rods 67 and it has a hub 116 engaging the inner sleeve 23. The hub 116, as may be seen in Fig. 6, carries a seal 117, and this is dimensioned so that it engages the outer sleeve 24 and also the inner sleeve 23.

From the structure thus far described, it will be apparent that the valve parts of the valve to be tested are securely sealed in the holder 62 by the toggle 61 and that the toggle action results in one or both of the valve sleeves being displaced as the operator elects.

It will be appreciated from the foregoing that the required measurements involve relative movement between the sleeves and the valve piston. This relative movement is best effected by reciprocating the valve piston 16, and is accomplished by an actuating rod 120 slidable in the mount 68 on the unit 44 and provided with a hardened steel contact 121 engageable with the proximate stem end of the valve piston 16. The rod 120 has a collar 122 engaged by a spring 123 backed by the mount 68 by which the rod 120 is urged into an inoperative position remote from the holder 62.

Movement of the actuator rod 120 against the action of the spring 123 is effected by an oscillating motor 124 attached to the unit 44. The motor drive shaft 125 carries a control cam 126 and the block 127, see Figs. 9 and 10, has an undercut way 128 for the slide 129 confined between end caps 130. A micrometer screw 131 extends through the slide 129 and is rotatably held by end caps 130 so that it may be turned from either end to move the slide 129 relative to the block 127, thus to establish the desired eccentric position of its pivot 132 that may be securely locked as by the set screw 133.

An arm 134 is attached to the pivot 132 and is also pivoted to the link 135, as at 136. The link 135 is pivotally joined as at 137 to the arm 138. The arm 138 is pivotally connected as at 140 to the actuator rod 120 and the arm 135 has a pivotal connection 141 with the stem 142 slidable in the mount 69 of the unit 44.

At the end of the stem 142 there is a rotatable micrometer cam 143 engaging the stem 144 of the micrometer 145 secured to the bracket 146 of the unit 44. As may best be seen in Fig. 5, the mount 69 has a chamber in which there are mounted clamping blocks 147 and 148 engageable with the stem 142. The blocks 147 and 148 are yieldably held apart by the spring 149 and are reversely threaded for attachment to appropriately threaded parts of the hand-adjusted screw 150.

In practice, the support 55 is seated against either the stop 59 or the stop 60, depending upon whether or not the valve to be tested is finished. Assuming the valve to be a finished one and sealed in the holder 62, the first adjustment is to set the actuator rod 120 with the left hand port 18 "cracked." With the arms 135 and 138 flat, the stem 142 is locked in position in the mount 69.

The slide 129 is then rotated through 90° so that the crank arm 134 is in either vertical position, and the slide 129 is then adjusted relative to the block 127 until the right hand port 19 is "cracked" so that as the motor 124 is then operated, oscillation of 90° effects reciprocation of the rod 120 through a stroke adequate to "crack" first one port and then the other.

As the rod 120 reciprocates, the gauging head 26 is operated and the stroke is marked on the chart of the recorder 27. As the head 26, the amplifier 28, and the chart recorder 27 are conventional, they are not herein detailed.

The hydraulic system, by which the pressure pen 39, associated with the chart recorder 27, is accurately operated, includes a suitable pressure source indicated generally at 155 having a supply line 156 connected to the conduit 35 and provided with a reducing valve 157, an accumulator 158, a solenoid valve 159, and a pressure gauge 160, before it is connected to the conduits 31 and 32.

The conduits 31 and 32 are each provided with a needle valve 161 and a check valve 162 and, while they are connected to their respective back pressure sections through the appropriate valve ports, there are also direct connections with that for the conduit 31, being indicated at 163, and that for the conduit 32, being indicated at 164. The back pressure sections 33 and 34 have, in addition to their pressure actuated switches 37 and 38, respectively, normally closed solenoid valves 165 and 166, check valves 167 and 168 and control valves 169 and 170, respectively. The delivery conduit 35 has a solenoid valve 171, a pressure regulator 172, and a pressure gauge 173.

Figure 12:
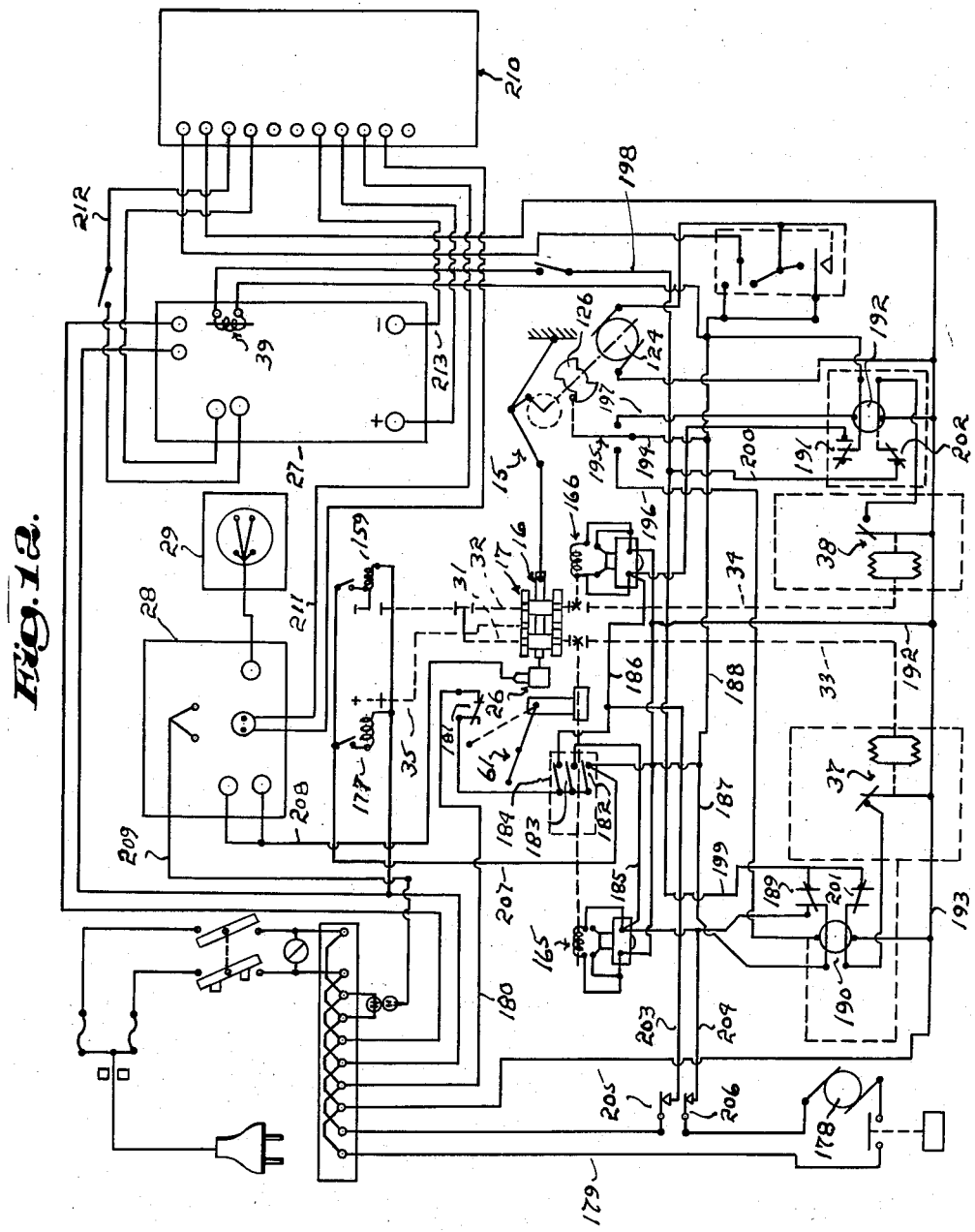
Fig. 12 is a schematic view of the electrical system.

All back pressure sections discharge into a common drain 175 whose return line 176 to the source is shown as having a suitable pump 177 driven by the motor 178 in the circuit 179, as indicated in Fig. 12.

The lead 180, as may be seen in Fig. 12, includes limit switches 181 and 182 and normally closed switches 183 and 184 connecting leads 185 and 186 thereto. The lead 180 includes the pressure pen 39 and has branch leads 187 and 188. The lead 187 includes a normally open switch 189, adapted to be closed when the relay 190 is energized, and the normally closed solenoid valve 165 in the back pressure section 33, and the lead 188 includes a normally open switch 191 adapted to be closed when the relay 192 is energized and the normally closed solenoid valve 166 in the back pressure section 34. The leads 187 and 188 have a common connection 192 to the ground 193.

The lead 188 also has a connection 194 with the switch 195 adapted to be actuated by the control cam 126 to close the leads 196 and 197 successively. The leads 196 and 197 include the relays 190 and 192, respectively.

When either of the leads 196, 197 is closed, the appropriate one of the relays 190, 192 is energized. As a consequence, the normally closed solenoid valve 165, 166 associated therewith is opened. It will be noted that the lead 198 from the pressure pen 39 includes parallel connections 199 and 200 with the ground 193 and these include normally open switches 201 and 202, respectively, adapted to be closed by the relays 190 and 192, respectively. The connections 199 and 200 also include the normally open pressure operated switches 37 and 38, respectively.

It will be noted that the leads 185 and 186 also include the solenoid valves 165 and 166 respectively and as their switches 183 and 184 are normally closed, i.e., when the toggle 61 is open, back pressures are normally vented. The circuit 179 is provided with parallel branch leads 203 and 204 provided with hand operated switches 205 and 206, respectively, and these leads also include the solenoid valves 165 and 166 so that the operator may vent either one of them at any time. The switch 182 also controls the lead 207 which includes in parallel the normally closed solenoid switches 159 and 171.

The circuit from the gauging head 26 to the amplifier 28 is indicated at 208, while the power cable thereto is indicated at 209. Connections between the amplifier 28 and the power unit 210 are indicated at 211 and connections between the power unit 210 and the chart recorder 27 are indicated at 212 and 213. As has been stated, the gauging head, amplifier, and recording chart are conventional so that their circuits are not otherwise detailed.

From the foregoing, it will be appreciated that apparatus in accordance with the invention is well adapted to meet the requirements where dead space travel is to be measured or otherwise analyzed and it is well adapted for use with valves of all types where dead space travel is significant.

What I therefore claim and desire to secure by Letters Patent is:

1. Apparatus for measuring the minimum travel of an axially movable valve piston relative to a sleeve body that is required to effect communication between outlet and inlet ports, said apparatus comprising a holder for said body, clamping mechanism to clamp said body to said holder, reciprocating means to move said piston relative to said body to place said ports in communication, a hydraulic system in communication with said ports and providing an inlet port pressure greater than the outlet port pressure and including back pressure sections, means in communication with the back section of the outlet port responsive to the inlet pressure, and separate mechanisms, each operated by a respective one of said pressure responsive and said reciprocating means and together being effective to measure and record said travel.

2. Apparatus for measuring the minimum travel of an axially movable valve piston relative to a sleeve body that is required to effect communication between outlet and inlet ports, said apparatus comprising a holder for said body, clamping mechanism to clamp said body to said holder, reciprocating means to move said piston relative to said body to place said ports in communication, a hydraulic system in communication with said ports and providing an inlet port pressure greater than the outlet port pressure and including back pressure sections, means in communication with the back section of the outlet port responsive to the inlet pressure, separate mechanisms, each operated by a respective one of said pressure responsive and said reciprocating means and together being effective to measure and record said travel, and a circuit including switch closed in response to the closing of said clamping mechanism.

3. Apparatus for measuring the minimum travel of an axially movable valve piston relative to a sleeve body that is required to effect the alternate communication of two outlet ports with an intermediate inlet port, said apparatus comprising a holder for said body, clamping mechanism to clamp said body to said holder, reciprocating means to move said piston relative to said body to place said outlet ports successively in communication with said ports and providing an inlet port pressure greater than the outlet port pressure and including back pressure sections, means in communication with the back sections of the outlet ports responsive to the inlet pressure, and separate mechanisms, each operated by a respective one of said pressure responsive and said reciprocating means and together being effective to measure and record said travel.

4. Apparatus for measuring the minimum travel of an axially movable valve piston relative to a sleeve body that is required to effect the alternate communication of two outlet ports with an intermediate inlet port, said apparatus comprising a holder for said body, clamping mechanism to clamp said body to said holder, reciprocating means to move said piston relative to said body to place said outlet ports successively in communication with said inlet port, a hydraulic system in communication with said ports and providing an inlet port pressure greater than the outlet port pressure and including back pressure sections, means in communication with the back sections of the outlet ports responsive to the inlet pressure, and electrically operated separate mechanisms, each operated by a respective one of said pressure responsive and said reciprocating means and together being effective to measure and record said travel, and including an electric circuit closed in response to the clamping of a body in said holder by said clamping mechanism and provided with parallel leads, one for each pressure responsive means, said leads being controlled by said reciprocating means.

5. In apparatus for measuring the minimum travel of an axially movable valve piston relative to a body that is required to effect the alternate communication of two outlet ports with an intermediate inlet port, a holder for said body, clamping mechanism to clamp said sleeves to said holder and including a toggle, reciprocating means to move said piston relative to said sleeves to place said outlet ports successively in communication with said inlet port, a hydraulic system in communication with said ports and providing an inlet port pressure greater than the outlet port pressure and including back pressure sections, means in communication with the back sections of the outlet ports responsive to the inlet pressure, separate mechanisms, each operated by a respective one of said pressure responsive and said reciprocating means and together being effective to measure and record said travel and including electric circuits arranged to include parallel leads, each including a means responsive to inlet pressure, and a drive for said reciprocating means including a cam controlled switch to close and open said leads.

6. Apparatus for measuring the minimum travel of an axially movable valve piston relative to a sleeve body that is required to effect the alternate communication of two outlet ports with an intermediate inlet port, said apparatus comprising a holder for said body, clamping mechanism to clamp said body to said holder, reciprocating means to move said piston relative to said body to place said outlet ports successively in communication with said inlet port, a hydraulic system in communication with said ports and providing an inlet port pressure greater than the outlet port pressure and including back pressure sections, means in communication with the back sections of the outlet ports responsive to the inlet pressure, electrically operated separate mechanisms, each operated by a responsive one of said pressure responsive and said reciprocating means and together being effective to measure and record said travel, and including an electric circuit closed in response to the clamping of a body in said holder by said clamping mechanism and provided with parallel leads, one for each pressure responsive means, said leads being controlled by said reciprocating means, and means controlled by each lead to vent the back pressure outlet section associated therewith.

7. In apparatus for measuring the minimum travel of an axially movable valve piston relative to a sleeve body that is required to effect communication between outlet and inlet ports, a holder having an axial seat for said body, a hydraulic system in communication with said ports, and toggle actuated clamping mechanism to clamp said body in said seat and to provide a seal against leakage between said holder and said piston, said mechanism including a clamping yoke fixed on said mechanism and an ejector yoke yieldably held in an inoperative position but coupled to said mechanism on predetermined movement of said clamping yoke away from said holder, said ejector yoke including ejectors engageable with said body.

8. In apparatus for measuring the minimum travel of an axially movable valve piston relative to a sleeve body having inner and outer sleeves, that is required to effect communication between outlet and inlet ports, a holder having an axial seat for said body, a hydraulic system in communication with said ports, and toggle actuated clamping mechanism to clamp said body in said seat and to provide a seal against leakage between said holder and said piston, said mechanism including a clamping yoke fixed on said mechanism, an ejector yoke yieldably held in an inoperative position but coupled to said mechanism on predetermined movement of said clamping yoke away from said holder, said ejector yoke including ejector means, one for each sleeve, and operator controlled means to render operable either the ejector means for both sleeves or the ejector means for said inner sleeve.

9. The apparatus of claim 8 in which the operable controlled means comprises a rotatable disc carried by the ejector yoke and having arcuate slots through which the ejector means for the inner sleeve extends and having apertures arcuately spaced from the ejector means for the outer sleeve when both sleeves are to be ejected but registering therewith when said disc is turned for the ejector only of the inner sleeve.

10. In apparatus for measuring the minimum travel of an axially movable valve piston relative to a sleeve body that is required to effect the communication of inlet and outlet ports, a holder for said body, clamping mechanism to clamp said body to said holder and reciprocating means to move said piston relative to said body, said means including first and second stems, a pair of links each pivotally connected to a respective one of said stems, a pivot joining said link, and a connecting rod between said crank and said pivot, said first stem being engageable with said piston, and means to lock said second stem in a predetermined position.

11. The apparatus of claim 10 in which the crank has a body provided with a diametrically disposed way, a slide to which said connecting rod is pivotally attached disposed in said way, and a threaded adjustment between said body and said slide.

12. The apparatus of claim 10 in which there is a micrometer-cam adjustment in control of said second stem.

13. In apparatus for measuring the minimum travel of an axially movable valve piston relative to a sleeve body that is required to effect the communication of inlet and outlet ports, a bed, first and second units slidable on said bed, said first unit and a gauging head slidable relative thereto but being fixed on said bed, said second unit being slidable on said bed comprising a holder for said body, toggle actuated clamping mechanism to clamp said body to said holder and anchored to said second unit, and reciprocating means to move said piston relative to said body to effect communication between said ports, said means being carried by said second unit and including an oscillating adjustable crank.

14. In apparatus for measuring the minimum travel of an axially movable piston relative to a sleeve body that is required to effect communication between outlet and inlet ports, a holder for slidably receiving the valve body and having a seat engageable by one end thereof, a hydraulic system in communication with said ports through said holder, toggle actuated clamping mechanism to clamp said body to said holder and to provide a seal against leakage between said body and said holder, said mechanism including a member engaging the other end of said body but leaving said piston free to move, and means to move said piston relative to said clamped body through a predetermined stroke, said means including a stem slidable relative to said member and engageable with the proximate end of said piston.

15. In apparatus for measuring the minimum travel of an axially movable piston relative to a sleeve body that is required to effect communication between outlet and inlet ports, a holder for slidably receiving the valve body and having a seat engageable by one end thereof, a hydraulic system in communication with said ports through said holder, toggle actuated clamping mechanism to clamp said body to said holder and to provide a seal against leakage between said body and said holder, said mechanism including a member engaging the other end of said body but leaving said piston free to move, and means to move said piston relative to said clamped body through a predetermined stroke, said means including a stem slidable relative to said member and engageable with the proximate end of said piston, a stem actuating toggle comprising a pair of pivotally interconnected links of which one is free to move and the other adjustably anchored, and an actuating unit including a member connected to one of said links.

16. In apparatus for measuring the minimum travel of an axially movable piston relative to a sleeve body that is required to effect communication between outlet and inlet ports, a holder for slidably receiving the valve body and having a seat engageable by one end thereof, a hydraulic system in communication with said ports through said holder, toggle actuated clamping mechanism to clamp said body to said holder and to provide a seal against leakage between said body and said holder, said mechanism including a member engaging the other end of said body but leaving said piston free to move, means to move said piston relative to said clamped body through a predetermined stroke, said means including a stem slidable relative to said member and engageable with the proximate end of said piston, a stem actuating toggle comprising a pair of pivotally interconnected links of which one is free to move and the other adjustably anchored, an actuating unit including a member connected to one of said links, and said member including portions threaded together to enable its length to be varied.

References Cited in the file of this patent

UNITED STATES PATENTS

| | | |
|---|---|---|
| 1,675,523 | Yarnall | July 3, 1928 |
| 2,035,472 | Hammond | Mar. 31, 1936 |
| 2,258,224 | Sheppard | Oct. 7, 1941 |
| 2,313,438 | Hoelscher | Mar. 9, 1943 |
| 2,459,535 | Kopischiansky | Jan. 18, 1949 |
| 2,565,086 | Peterson | Aug. 21, 1951 |
| 2,638,777 | Sadler | May 19, 1953 |